United States Patent
Snyder, Jr. et al.

[11] Patent Number: 5,984,233
[45] Date of Patent: Nov. 16, 1999

[54] ELASTOMERIC TUNED VIBRATION ABSORBER

[75] Inventors: Paul J. Snyder, Jr., Erie; Marshall W. Downing, Fairview, both of Pa.

[73] Assignee: Lord Corporation, Cary, N.C.

[21] Appl. No.: 08/979,268

[22] Filed: Nov. 26, 1997

[51] Int. Cl.$^6$ .............................. B64C 1/00; F16M 1/00; F16F 7/10

[52] U.S. Cl. ........................ 244/119; 267/136; 188/379

[58] Field of Search ................................ 244/119, 129.1, 244/133, 1 N, 17.27, 117 R; 267/136; 188/379, 380

[56] References Cited

U.S. PATENT DOCUMENTS

| | | | |
|---|---|---|---|
| 3,102,722 | 9/1963 | Hamontre | 267/136 |
| 4,527,371 | 7/1985 | Hagbjer | 267/136 |
| 5,052,530 | 10/1991 | Shimazaki | 188/379 |
| 5,135,204 | 8/1992 | Funahashi | 188/379 |
| 5,641,133 | 6/1997 | Toossi | 244/17.27 |
| 5,845,236 | 12/1998 | Jolly et al. | 267/136 |

OTHER PUBLICATIONS

Lord Corporation, Aerospace Products, Product Information, *Tuned Vibration Absorbers—A Quiet Revolution*, PB–6004, Aug. 1992.

*Primary Examiner*—Peter M. Poon
*Assistant Examiner*—Charles R Ducker, Jr.
*Attorney, Agent, or Firm*—Randall S. Wayland

[57] ABSTRACT

A tuned vibration absorber includes a mounting plate having at least two, and alternatively four, mounting holes in spaced relationship from a longitudinal center axis of the plate. An elastomeric spring is bonded to the mounting plate. A main tuning mass is bonded to the elastomeric spring opposite the mounting plate, and fine tuning masses are riveted directly onto the main tuning mass. The elastomeric spring and main mass both have a rectangular profile to maintain a low profile height from the mounting plate. A cover is formed of a single sheet of metal bent to form a rectangular box with one open side. The cover includes mounting flanges with holes that align with the mounting holes on the mounting plate. For mounting the vibration absorber on a stiffening ring of an aircraft frame, a spacing plate is positionable between a portion of the mounting plate and the stiffening rib of an aircraft frame, and adjacent to an overlapping secondary stiffening ring to provide a flat mounting surface.

13 Claims, 5 Drawing Sheets

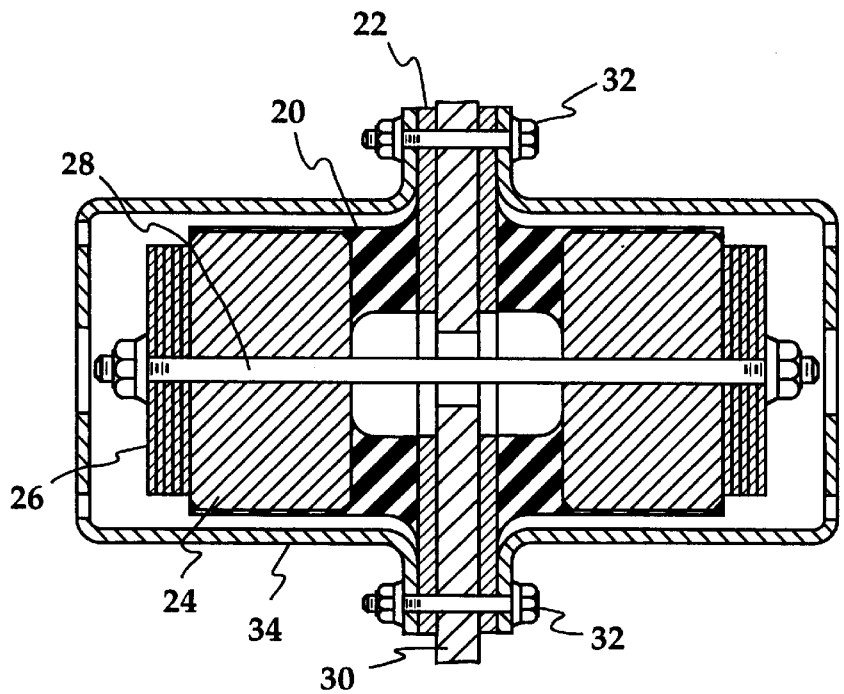
Fig. 1a
Prior Art
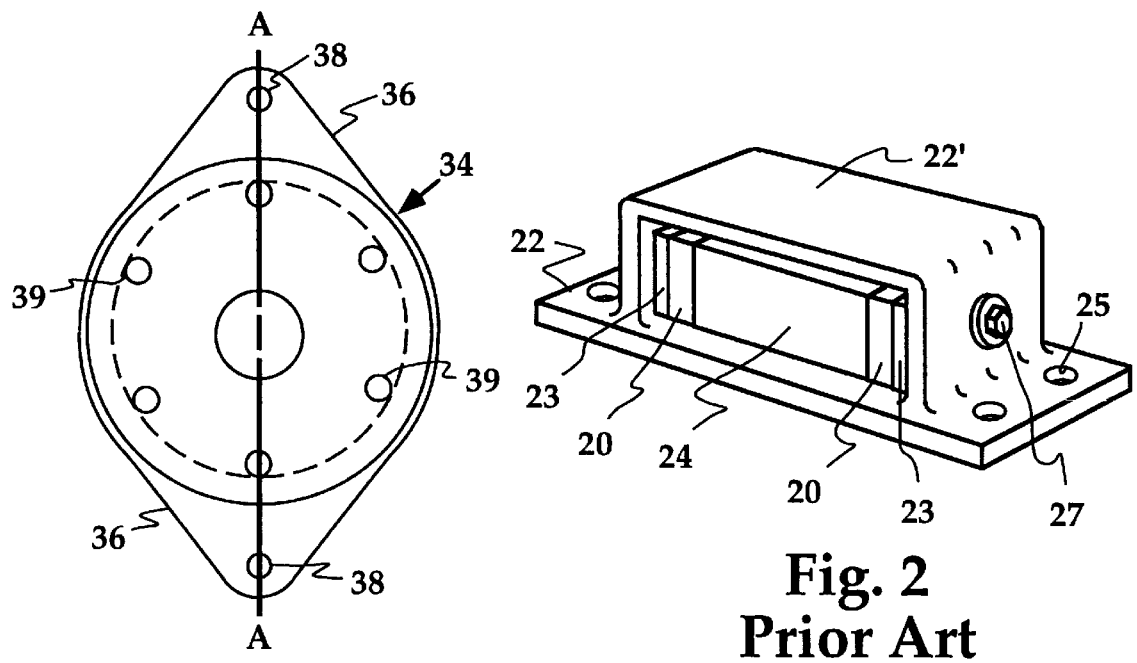
Fig. 1b
Prior Art
Fig. 2
Prior Art

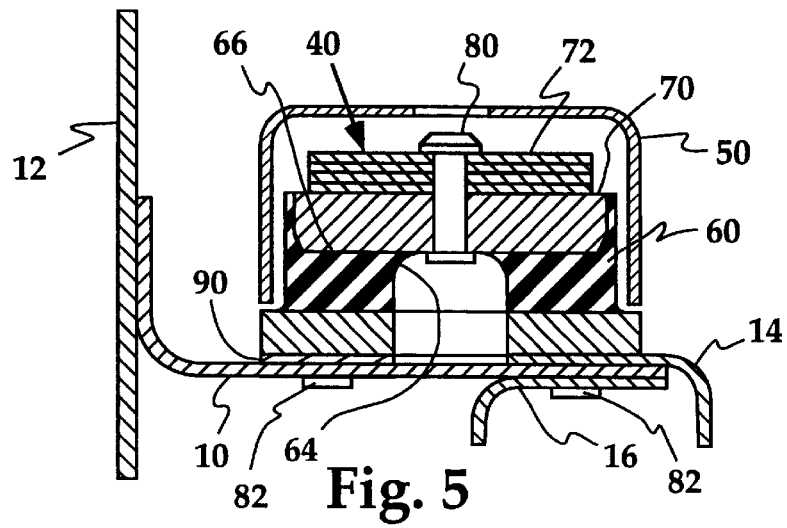
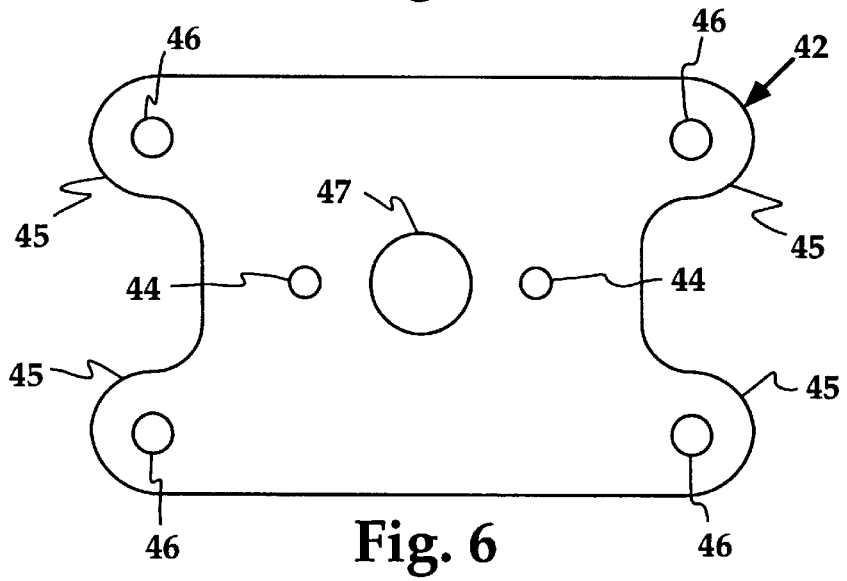
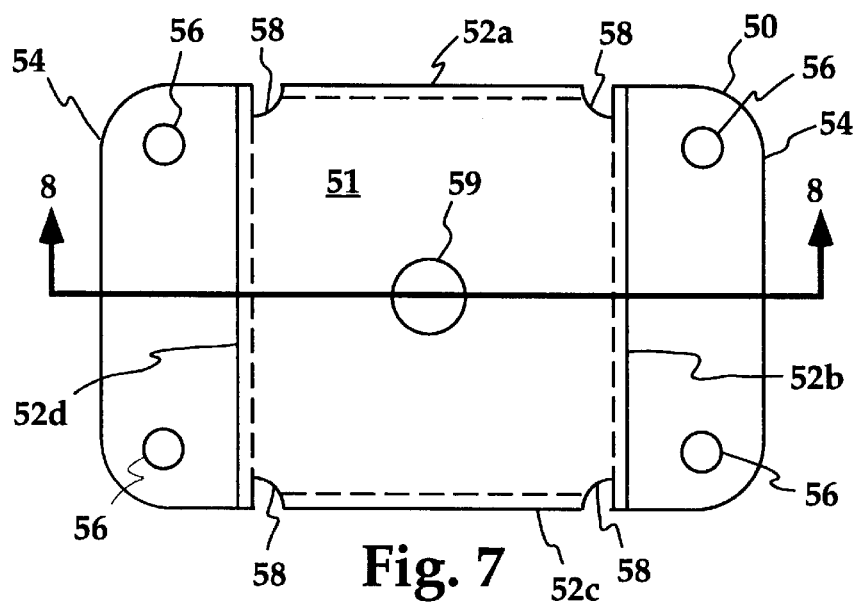

ELASTOMERIC TUNED VIBRATION ABSORBER

FIELD OF THE INVENTION

The invention relates to tuned vibration absorbers having a spring and a tuned mass. More particularly, the present invention is directed to tuned vibration absorbers for aircraft frames.

BACKGROUND AND SUMMARY

Tuned vibration absorbers (TVA) are secondary mass-spring systems that can be tuned to vibrate at a select frequency to absorb vibration occurring at that frequency. TVAs are used, for example, in aircraft fuselages to absorb the vibration caused by propeller aerodynamic wash impinging on the fuselage.

Examples of prior art tuned vibration absorbers are illustrated in FIGS. 1a, 1b and 2. The absorber illustrated in FIGS. 1a and 1b includes an annular elastomeric spring 20 bonded on a base plate 22. A tuned mass includes a large body 24 and a plurality of washers 26 fastened to the large body to fine tune the total mass. A shaft 28 extends through the center of the spring 20 and through holes in the large body 24 and the washers 26 to fasten these components together. The base plate 22 is mounted to a target structure 30 by two nut and bolt combinations 32. As shown, the absorber is paired with an identical absorber mounted on an opposite side of the target structure, which is a typical arrangement for mounting the absorbers in an aircraft frame. A mass vibrating at a distance from a rib (as in the absorber of FIG. 1) will produce a bending moment on the rib. The absorbers of the prior art are paired so that bending moments imparted to the rib by each absorber are cancelled by the paired absorber.

A cup-shaped cover 34, best illustrated in FIG. 1b, is mounted over the spring 20 and masses 24, 26 to isolate the spring and masses from external interference. The cover has mounting flanges 36 providing two linearly aligned mounting holes 38. A plurality of air holes 40 is provided in the cover top to allow condensate to escape.

FIG. 2 illustrates another prior absorber having a base 22 and a three-sided cover 22'. A mass 24 is bonded between two elastomeric springs 20. The spring 20 and mass 24 assembly is contained between metal end plates 23. A bolt 27 extends through the assembly and is fastened on opposite walls of the cover 22'. The system is tuned to a vibration frequency by adjusting the tension in the bolt and thus the compression in the spring. Four mounting holes 25 are used with nut and bolt combinations to fasten the device to a structure.

The prior art devices have deficiencies in manufacturing and performance. For example, the device of FIG. 1a mounts to a target structure with a mounting plate having two, linearly aligned mounting holes. Two holes are conventionally provided because of space constraints in aircraft frame structure, that is, the difficulty in finding a flat surface to mount vibration absorbers. In an aircraft frame, the stiffening rings are often additionally supported by secondary stiffening rings that leave little room for mounting a vibration absorber. The device is typically mounted so that the spring vibrates in shear, that is, perpendicular to the shaft 28 shown in FIG. 1a.

The inventor of the present invention has discovered that the prior vibration absorber is subject to a rocking moment about an axis A—A formed by the mounting bolts when the absorber vibrates at the disturbance frequency. The rocking moment can interfere with the device vibrating at the tuned frequency, and over time, can cause the bolts to loosen.

In the device of FIG. 2, the bolt 27 supplying tension to the spring and mass system is subject to vibration itself if not tightened correctly.

The present invention provides a tuned vibration absorber that is simpler to mount to an aircraft frame.

The tuned vibration absorber is designed with a low profile that minimizes the bending moment imparted to an aircraft frame stiffening rib, and as a result, can be mounted as a single, unpaired unit. This reduces the number of vibration absorbers needed in an aircraft, which accordingly reduces the cost.

The tuned vibration absorber with a four hole mounting plate also advantageously eliminates the problem of a rocking moment created by the prior mounting structure.

According to the invention, a tuned vibration absorber includes a mounting base having at least two holes arranged off the center axis of the spring mass system. The mounting holes may be alternatively provided as four holes in rectangular spaced relationship. The four mounting holes advantageously eliminate the rocking moment problem of the prior art.

According to another aspect of the invention, an elastomer spring is bonded to the mounting base and supports a main mass, which forms a spring and mass vibrating system. The elastomeric material is selected to have a resiliency to provide a spring constant appropriate for the tuned vibration frequency. The mass is fine tuned by attaching fine tuning masses, having a washer-like shape to the main mass. The fine tuning masses are attached to the main mass directly by rivets. Rivet fasteners provide sufficient fastening tightness and strength so that the main mass and fine tuning masses act as a single mass in cooperation with the spring.

According to another aspect of the invention, a cover to isolate the spring and mass system from external interference is formed from a single sheet of stamped metal bent into a box shape. The cover is easily formed to have gaps between the adjacent bent walls to prevent edge contact of the walls which may cause noise. Further, bending easily provides flanges, on which mounting holes to mate with the mounting base are provided.

The main mass and elastomer spring are shaped with rectangular outlines, which provides a center of gravity distance from the mounting plate that is smaller for the same mass than the cylindrically shaped mass of the prior art. By positioning the center of gravity of the mass closer to the mounting plate, and thus, the stiffening rib, any bending moment produced by the mass is minimized.

For mounting the vibration absorber to a stiffening ring of an aircraft, which is an advantageous location, the invention provides spacing plates to accommodate the thickness of a secondary stiffening ring that overlaps a main stiffening ring. The spacing plate is positioned on a main stiffening ring adjacent to the overlapping secondary stiffening ring to provide a flat surface for mounting the vibration absorber.

BRIEF DESCRIPTION OF THE DRAWINGS

The invention will become better understood by reference to the description that follows, in conjunction with the appended drawings, in which:

FIG. 1a is a sectional view of a vibration absorber according to the prior art;

FIG. 1b is a top view of an absorber cover according to the prior art;

FIG. 2 is a perspective view of another vibration absorber according to the prior art;

FIG. 5 is a section view of the tuned vibration absorber of FIG. 3 taken along the line 5—5;

FIG. 6 is a top view of a mounting plate of the tuned vibration absorber of FIG. 3;

FIG. 7 is a top view of a cover of the tuned vibration absorber of FIG. 3;

DETAILED DESCRIPTION OF THE PREFERRED EMBODIMENTS

Figure 3:
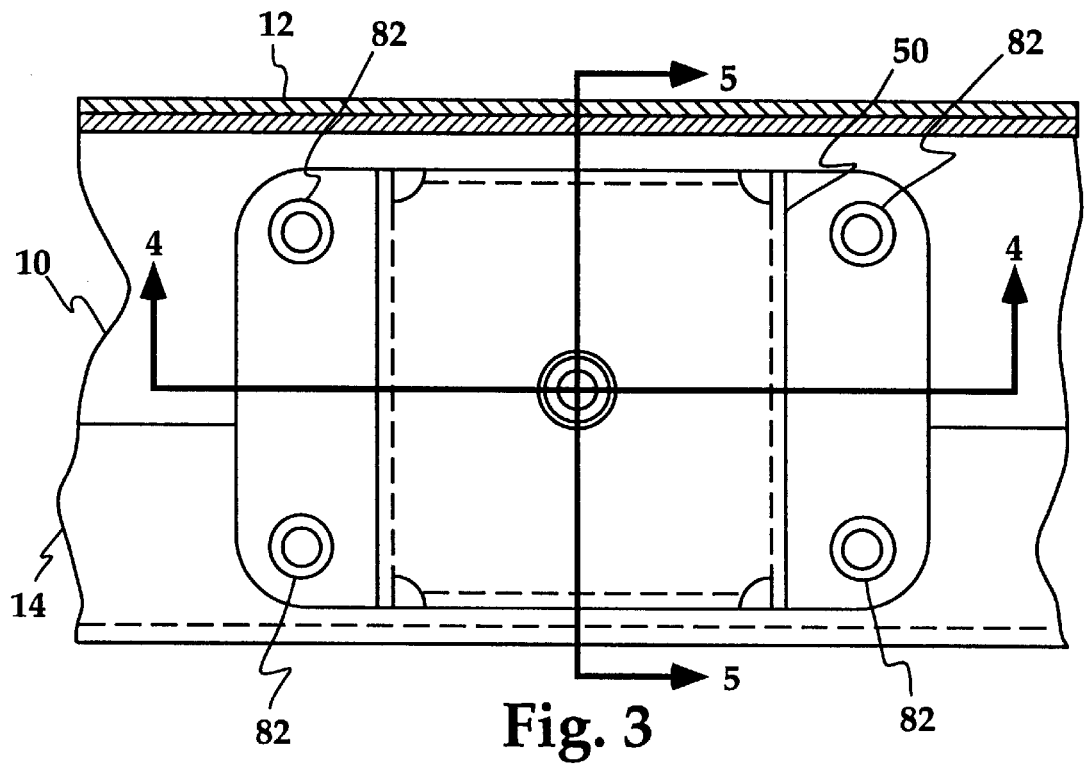
FIG. 3 is a top view of a tuned vibration absorber mounted to a stiffening ring in an aircraft in accordance with the invention.

A tuned vibration absorber 40 according to the invention is illustrated in FIG. 3 mounted to a main stiffening ring 10 of an aircraft. The main stiffening ring 10 has an L-shaped profile, and supports the outer skin 12 of the aircraft. An aircraft frame typically includes a plurality of main stiffening rings in spaced orientation along the length of the fuselage. Additional support is provided by secondary stiffening rings 14 and 16 (shown in FIG. 5) which are fastened to the main stiffening ring 10 in an overlapping fashion.

Figure 4:
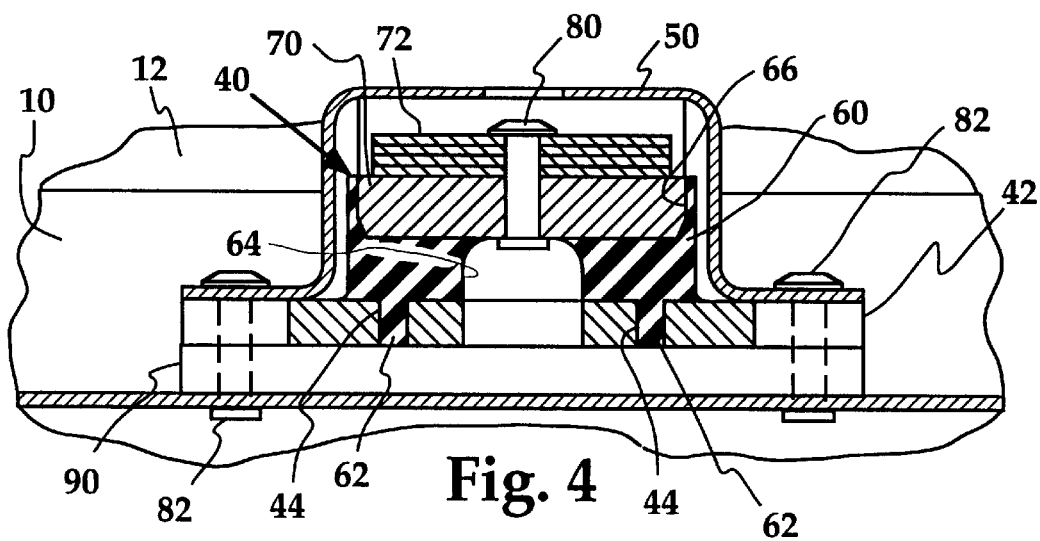
FIG. 4 is a section view of the tuned vibration absorber of FIG. 3 taken along the line 4—4.
Figure 8:
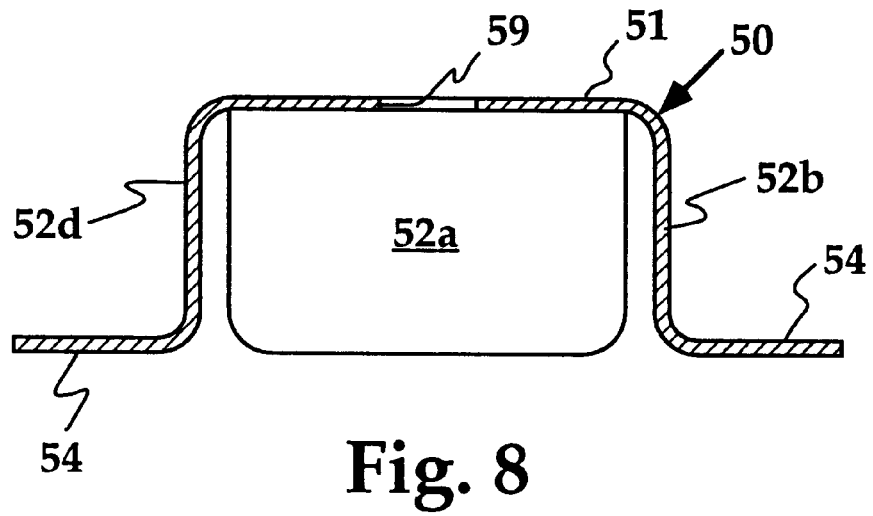
FIG. 8 is a section view of the cover of FIG. 7 taken along the line 8—8.

Referring now to FIGS. 3–5, the vibration absorber 40 includes a mounting base 42 (shown separately in FIG. 6) and a cover 50 that is fastened to the mounting base 42 to enclose a space. The mounting base 42 includes a thin sheet having four lugs 45 with mounting holes 46 and a central aperture 47 formed therein. An elastomeric spring 60 is bonded to the mounting base 42, by molding the mounting base in place when the elastomeric spring is molded. The elastomer for forming the spring 60 is injected through sprues 44 during molding.

The spring 60 is formed from an elastomeric material, such as silicone material, selected to have a resiliency for providing a spring constant. The spring 60 is shaped with a central access hole 64 on a lower surface. In the illustrated embodiment, the spring 60 has a rectangular profile or outline when viewed from the top, that is, the view of FIG. 11. Preferably, the spring is rectangular or square in outline as seen in top view.

A main mass 70 is bonded on an upper surface 66 of the spring 60 by molding the main mass in place when the elastomeric spring is molded. The main mass 70 is a body with a selected mass value that will, in conjunction with the spring 60, vibrate at a selected frequency. The main mass 70 may be formed of tungsten or steel, which are relatively dense materials to maintain a small size. The main mass 70 is rectangular or square in shape and is bonded to an upper surface 66 of the spring 60. The molding process may permit elastomer material to flow on the peripheral edges of the main mass 70 as seen in FIGS. 4 and 5.

The main mass 70 and spring 60 are rectangular in profile to provide a center of gravity with a small distance from the mounting plate 42, as compared to a similar mass value for a cylindrical mass, as used in the art. The smaller distance to the center of gravity means that the vibrating mass will produce a smaller moment on the mounting plate, and thus, the stiffening rib to which the plate is mounted. The vibration absorber of the present invention, therefore, can be mounted as a single, unpaired unit on a stiffening rib, which reduces the cost in an aircraft installation.

To fine tune the main mass 70 for a particular frequency, fine tuning masses 72 are attached to the main mass 70. The fine tuning masses 72 are washer-shaped components having a center hole. The fine tuning masses are positioned on the main mass 70 and are secured thereto by a rivet fastener 80 that extends through the center hole in the fine tuning masses 72 and the main mass 70. The access hole 64 in the spring 60 allows the rivet 80 to be fastened directly to the lower surface of the main mass 70. In this way, the fastening force of the rivet 80 does not cause compression on the spring 60, and thus, does not need be taken in account in tuning the absorber. Rivet assembly advantageously provides a fastening that permits the assembled masses 70, 72 to approximate a single structural unit.

The cover 50 is illustrated in top view in FIG. 7 removed from the absorber 40. The cover 50 isolates the spring and mass system from external objects that could come in contact and prevent vibration of the system, thus disrupting the vibration absorbing ability of the device. In an aircraft, the space between the stiffening rings in the frame is typically filled with insulating material, such as fiber batt, and the cover 50 prevents this material from contacting the spring and mass.

The cover 50 is formed of a single sheet of metal that is stamped into the outline shape and bent to form a top wall 51 with four side walls 52a, 52b, 52c, and 52d that define a rectangular, and preferably square, space. On two opposing side walls 52b and 52d, flanges 54 are provided for mounting the cover on the base 42. The flanges 54 each have two mounting holes 56 for a total of four mounting holes arranged in a rectangular spaced relationship. Gaps 58 are provided between the adjacent side walls to prevent the adjacent walls from contacting during vibration, which could produce noise. A center hole 59 is provided on the top wall 51 for visual inspection of the spring 60 and masses 70, 72.

Figure 9:
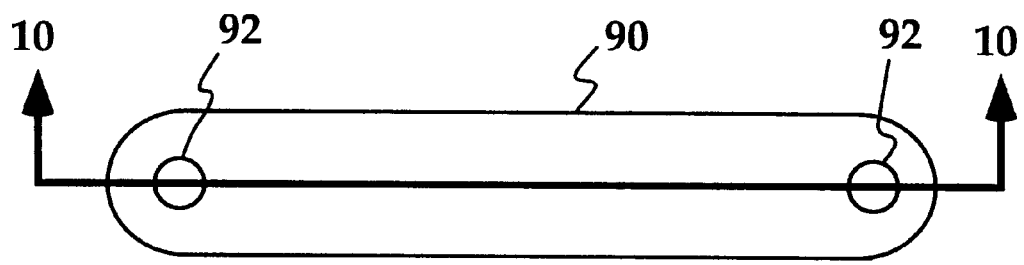
FIG. 9 is a top view of a spacer plate for mounting the tuned vibration absorber in an aircraft frame.
Figure 10:
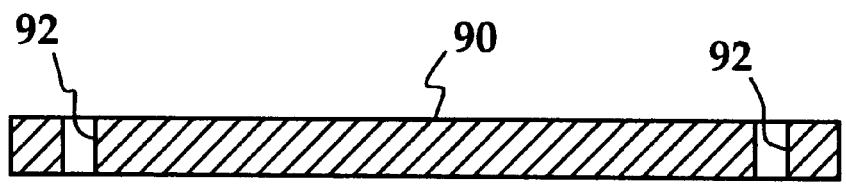
FIG. 10 is a section view of the spacer plate of FIG. 9 taken along the line 10—10.

Referring again to FIG. 5, when the tuned vibration absorber 40 is mounted on a stiffening ring 10 of an aircraft frame, the absorber 40 may span a distance the includes the main stiffening ring 10 and a secondary stiffening ring 14. Because the secondary stiffening ring 14 overlaps the main ring 10, an uneven surface is available for mounting the absorber 40. To provide a flat surface, a spacer plate 90 (shown in FIG. 9 and FIG. 10) is provided on the main stiffening ring 10 adjacent to the overlapped portion of the secondary stiffening ring 14.

The spacer plate 90 is an elongated bar with mounting holes 92 at opposite ends. The spacer plate 90 has a thickness equivalent to the thickness of the secondary stiffening ring 14.

The tuned vibration absorber 40 is mounted to the flat surface provided by the spacer plate 90 and the stiffening ribs 10, 14, by four rivets 82 positioned in the aligned mounting holes of the cover 50, mounting plate 42 and the spacer plate 90. With four mounting rivets, the problem in the prior art device of rocking about the linearly arranged bolts is eliminated, which improves the vibration absorbing ability and the durability of the absorber. Positioning the vibration absorbers on the stiffening rings 10 is advantageous for coupling the absorbers with the pathway of high vibration transmission. The use of rivets, rather than nuts and bolts as in the prior art, provides a more secure mounting that more closely integrates the vibration absorber with the ribs structure, which provides better transmission of the vibration in the frame to the vibration absorber for improved performance.

Figure 11:
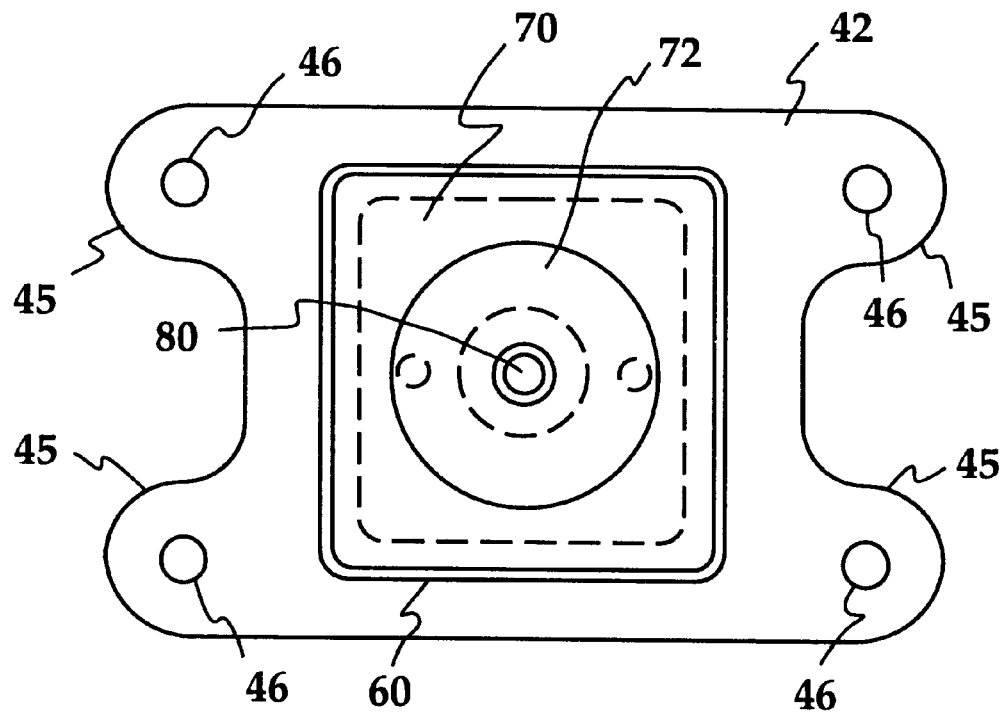
FIG. 11 is a top view of the tuned vibration absorber with the cover removed.

FIG. 11 illustrates a top view of the tuned vibration absorber assembly with the cover removed. The elastomer spring 60 is bonded to the mounting plate 42. The tuned mass, which includes the main mass 70 and the fine tuning masses 72 fastened together by the rivet 80, is bonded to the elastomer spring 60.

Figure 12:
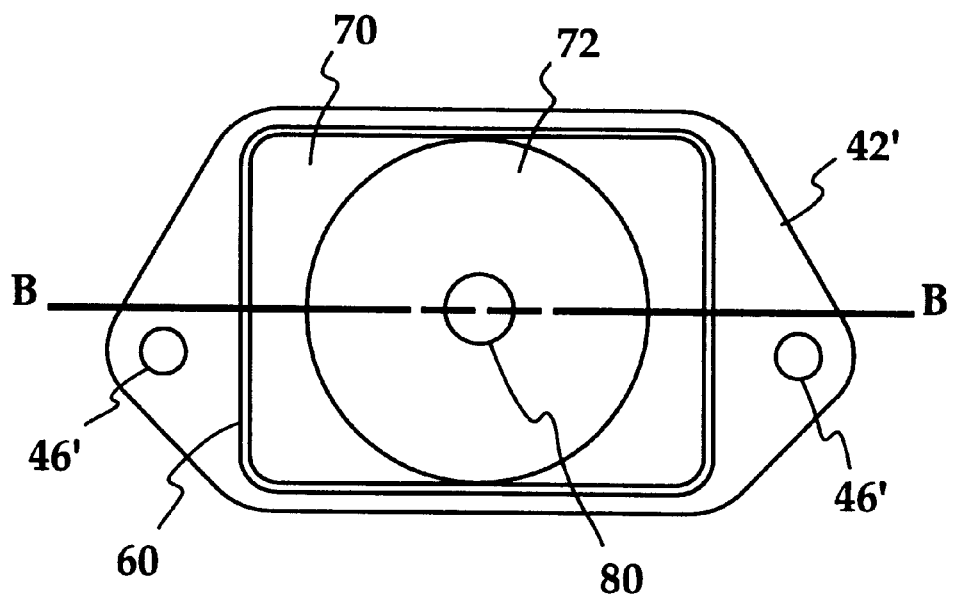
FIG. 12 is a top view of an alternative embodiment of the tuned vibration absorber having two offset mounting holes.

FIG. 12 illustrates a top view of an alternative embodiment of the absorber, with the cover removed, in which the mounting plate 42' is provided with two mounting holes 46'. The spring and masses are identical to those described above. The mounting holes are offset from a longitudinal center axis B—B of the absorber. The cover, not illustrated, has two holes in the same pattern arrangement. This arrangement is advantageous in circumstances where little mounting space is available. In a mounting arrangement in an aircraft frame which requires the spacer plate 90, the spacer plate is positioned under the two mounting holes 46' for fastening onto the stiffening rib.

The invention has been described in terms of preferred principles, method steps, and structure, however, the particular examples given are meant to be illustrative and not limiting. Substitutions and equivalents as will occur to those skilled in the art are included within the scope of the invention as defined by the following claims.

What is claimed is:

1. A tuned vibration absorber assembly, comprising:
   a mounting plate having at least two mounting holes offset from a longitudinal center axis of the mounting plate;
   an elastomeric spring bonded to the mounting plate, the elastomeric spring having a selected spring constant;
   a main tuning mass bonded to the elastomeric spring opposite the mounting plate;
   at least one fine tuning mass disposed on the main tuning mass;
   a rivet extending through aligned holes in the at least one fine tuning mass and the main tuning mass to fasten the fine tuning mass to the main tuning mass; and
   a cover, formed of a sheet of metal bent to form a rectangular box with one open side, the cover having mounting flanges with holes that align with the mounting holes on the mounting plate.

2. The vibration absorber as claimed in claim 1, further comprising at least one spacing plate positionable between a portion of the mounting plate and a stiffening rib of an aircraft frame.

3. The vibration absorber as claimed in claim 1, wherein the at least two mounting holes includes four mounting holes arranged in rectangular, spaced relationship.

4. The vibration absorber as claimed in claim 1, wherein the at least two mounting holes are arranged on a mounting axis laterally spaced from the center axis of the mounting plate.

5. The vibration absorber as claimed in claim 1, wherein the main tuning mass and the elastomeric spring are shaped with rectangular outlines.

6. In an aircraft frame having a plurality of main stiffening rings, a tuned vibration absorber comprising:
   a mounting plate having at least two mounting holes spaced from a longitudinal center axis of the mounting plate, the mounting plate mounted on a stiffening ring;
   an elastomeric spring bonded to the mounting plate, the elastomeric spring having a selected spring constant;
   a main tuning mass bonded to the elastomeric spring opposite the mounting plate;
   at least one fine tuning mass disposed on the main tuning mass;
   a rivet extending through aligned holes in the at least one fine tuning mass and the main tuning mass to fasten the fine tuning mass to the main tuning mass;
   a cover positioned over the tuning masses and the elastomeric spring with a surrounding space, the cover having mounting holes corresponding in number and position to the mounting holes in the mounting plate; and
   a rivet extending through each of the like positioned holes in the cover and mounting plate and fastening the tuned vibration absorber to said stiffening ring.

7. The tuned vibration absorber as claimed in claim 6, wherein the at least two mounting holes in the mounting plate include four holes in spaced relation adjacent to a periphery of the mounting plate.

8. The tuned vibration absorber as claimed in claim 6, wherein the aircraft frame further includes a plurality of secondary stiffening rings partly overlapping and attached to said main stiffening rings, the device further comprising a spacing plate positioned on the main stiffening rib and adjacent a secondary stiffening ring, the at least one spacing plate having a thickness substantially equal to that of said secondary stiffening ring, the spacing plate being between the stiffening ribs and the mounting plate.

9. The tuned vibration absorber as claimed in claim 6, wherein the main tuning mass and the elastomeric spring are shaped with rectangular outlines.

10. The tuned vibration absorber as claimed in claim 6, wherein the cover comprises a sheet of metal bent to form a rectangular box with a top, four side walls and being open on one side, the cover mounting having mounting flanges extending from two opposing side walls, the flanges having the mounting holes that correspond in number and position with the mounting holes on the mounting plate, and wherein adjacent side walls have a gap therebetween.

11. The tuned vibration absorber as claimed in claim 6, wherein at each of a plurality of selected mounting locations in the aircraft frame, a single tuned vibration absorber is mounted.

12. A method for mounting a tuned absorber to a stiffening ring structure of an aircraft frame, in which structure main stiffening rings are supported by secondary stiffening rings, the method comprising the steps of:
   selecting at least one spacing plate for providing a flat surface at a location where a secondary stiffening ring overlaps a main stiffening ring;
   positioning a tuned absorber assembly on said flat surface, said tuned absorber including a mounting plate, a cover, and an elastomeric spring and mass vibration absorbing system contained within said cover, said mounting plate and said cover having at least two pairs of aligned mounting holes, the pairs of mounting holes being offset from a longitudinal axis of the tuned absorber assembly; and
   fastening said tuned absorber assembly to said flat surface by securing at least two rivets to the at least four mounting holes in the mounting plate and cover.

13. The method as claimed in claim 12, wherein the mounting plate and the cover each have four mounting holes arranged proximal to a periphery of the mounting plate and cover, mounting holes in the mounting plate and cover being aligned in pairs, and wherein the method includes the step of fastening the tuned absorber assembly to the said flat surface by securing four rivets to the four aligned pairs of mounting holes.

* * * * *